D. Sherwood,
Sieve.
N° 36,982.    Patented Nov. 18, 1862.
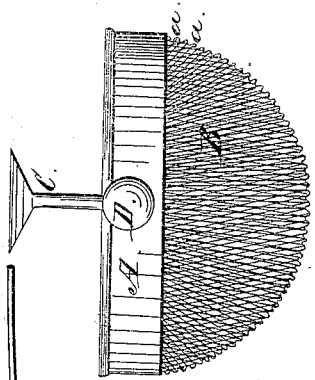
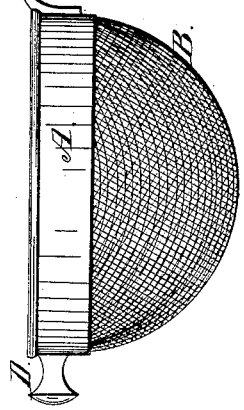
Witnesses:
Jonas P. Varnum
J. N. Marshall
Inventor:
Daniel Sherwood

UNITED STATES PATENT OFFICE.

DANIEL SHERWOOD, OF LOWELL, MASSACHUSETTS, ASSIGNOR TO HIMSELF AND EDWARD P. WOODS, OF SAME PLACE.

IMPROVED WIRE-GAUZE STRAINER.

Specification forming part of Letters Patent No. 36,982, dated November 18, 1862.

*To all whom it may concern:*

Be it known that I, DANIEL SHERWOOD, of the city of Lowell, county of Middlesex, and State of Massachusetts, have invented a new and Improved Corrugated Wire Strainer for Liquids, &c.; and I do hereby declare the following to be a full, clear, and exact description thereof, reference being had to the accompanying drawings, figures, and letters of reference thereon, making part of this specification.

Figure 1 is a side elevation of my improved strainer. Fig. 2 is an end view showing the corrugations $a\ a$.

Similar letters of reference indicate like parts in the drawings.

My invention consists in the employment and use of corrugated wire for liquid-strainers, which is tinned, galvanized, or othewise treated to prevent the action of acids, and also in combining with a strainer a rest to support the strainer over a vessel to receive the liquid.

To enable others skilled in the art to make and use my invention, I will describe the construction thereof.

A represents a band or rim of the desired size, provided with a handle, C, and rest D, for supporting the strainer over any vessel to receive the strained liquid. To the band or rim A is secured, by soldering or otherwise, the strainer-bowl B, made of corrugated or "twilled" wire cloth, which has been previously formed between dies of the proper size and shape.

The operation of forming the bowl from wire-cloth, woven, twilled, or corrugated expressly for my use, (and which is to the best of my knowledge a new article of manufacture,) is simply to cut the wire-cloth of the desired size and form it into shape between the dies, taking care that they just come together, so as to shape the bowl properly without injuring the cloth.

The great advantage derived from corrugated or twilled wire cloth is that it can be formed up readily between the dies, being elastic, preserves perfectly the interstices for the liquid to flow through as well as the shape, and is very strong and durable.

I claim—

As an improved article of manufacture, a strainer for liquids made of corrugated or twilled wire-cloth, substantially as described.

DANIEL SHERWOOD. [L. S.]

Witnesses:
  JONAS P. VARNUM,
  J. N. MARSHALL.